(12) United States Patent  
Turner (10) Patent No.: US 7,108,090 B2
(45) Date of Patent: Sep. 19, 2006

(54) MOTORIZED CART WITH HUB GEAR MOTOR SYSTEM

(75) Inventor: Patrick E. Turner, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 162 days.

(21) Appl. No.: 10/288,805

(22) Filed: Nov. 5, 2002

(65) Prior Publication Data

US 2003/0085064 A1    May 8, 2003

Related U.S. Application Data

(60) Provisional application No. 60/348,051, filed on Nov. 6, 2001.

(51) Int. Cl.
*B60K 1/02* (2006.01)
(52) U.S. Cl. .................................... 180/65.5; 180/65.6
(58) Field of Classification Search ............ 180/65.5, 180/65.6, 907, 65.1, 11, 12, 13, 23
See application file for complete search history.

(56) References Cited

U.S. PATENT DOCUMENTS

| 672,713 | A | | 4/1901 | Sanchis |
| 3,090,456 | A | | 5/1963 | Blenkie |
| 3,872,945 | A | * | 3/1975 | Hickman et al. .......... 180/65.6 |
| 3,897,843 | A | * | 8/1975 | Hapeman et al. .......... 180/65.5 |
| 3,948,332 | A | * | 4/1976 | Tyner ....................... 180/19.1 |
| 4,403,673 | A | | 9/1983 | Ball |
| 4,412,595 | A | | 11/1983 | Kinzel |
| 4,452,327 | A | * | 6/1984 | Mowat et al. ................ 180/11 |
| 5,048,626 | A | | 9/1991 | Strehler et al. ............ 180/19.2 |
| 5,366,036 | A | * | 11/1994 | Perry ........................ 180/65.1 |
| 5,366,037 | A | * | 11/1994 | Richey ...................... 180/65.5 |
| 5,375,673 | A | * | 12/1994 | McCall et al. ................ 180/13 |
| 5,521,808 | A | * | 5/1996 | Marusik et al. ............... 363/49 |
| 5,526,894 | A | * | 6/1996 | Wang ........................ 180/65.1 |
| 5,560,442 | A | | 10/1996 | Canderle |
| 5,600,191 | A | * | 2/1997 | Yang ........................ 310/67 R |
| 5,633,544 | A | * | 5/1997 | Toida et al. ............... 310/67 R |
| 5,691,584 | A | * | 11/1997 | Toida et al. ............... 310/67 R |
| 6,057,617 | A | | 5/2000 | Schmid |
| 6,321,863 | B1 | | 11/2001 | Vanjani |
| 6,481,518 | B1 | * | 11/2002 | Wu ............................ 180/65.6 |

* cited by examiner

*Primary Examiner*—Christopher P. Ellis
*Assistant Examiner*—Bridget Avery
(74) *Attorney, Agent, or Firm*—Boyd D. Cox (57) ABSTRACT

The invention is directed to a motorized cart and a hub gear motor system in which the electric motor of the system is contained within the hub casing of a front wheel of the motorized cart. The hub gear motor system provides the motorized cart with front wheel drive.

13 Claims, 7 Drawing Sheets

MOTORIZED CART WITH HUB GEAR MOTOR SYSTEM

This application claims benefit of 60/348,051 filed on Nov. 6, 2001.

I. BACKGROUND

The present invention is directed to a motorized cart with a hub gear motor system. The motorized cart has a front wheel and two rear wheels. The front wheel of the motorized cart is driven by the hub gear motor system which comprises an electric reversible motor that is contained within the front wheel.

Motorized carts are commonly used in stores and homes to provide mobility for individuals that are unable to walk or stand for any length of time. Because of their size and large turning radius, these carts can be difficult to maneuver in an area with limited space. Due to such space limitations, most stores and homes are generally unable to accommodate such motorized carts without renovating or rearranging the area in which the carts are to be used.

Most motorized carts for shopping and home use are powered by electric motors mounted on the frame of the cart. A drive train translates the rotational movement of the motor to one or both rear wheels. The drive train adds to the weight of the cart requiring that the amount of power to operate the cart be increased according to the weight added by the drive train thereby increasing the requisite size of the cart.

In addition, having rear wheel drive can reduce the efficiency of the cart's motor since power is lost through the drive train as rotation is transmitted from the motor to the wheel(s) of the cart. Therefore, these motorized carts require at least a 24-volt rechargeable battery system in order to have adequate power to operate the cart properly. Inherent drawbacks exist with 24-volt battery systems. Generally, a 24-volt battery system comprises a pair of 12-volt batteries. Not only is such a system more complex since the batteries are connected in a series, but batteries connected in a series are also difficult to consistently recharge. Typically, one of the batteries in a series will overcharge and the other battery will fail to fully charge. Such a recharging routine is inefficient and can be frustrating for a user. It is not uncommon to improve these systems by providing a separate charger for each battery in the series. This can significantly increase the weight of the cart and increase the cost of manufacturing.

One aspect of the cart's maneuverability can be determined by its turning radius. The smaller the turning radius the more maneuverable is the cart, making it easier to manage in small areas. A cart with rear wheel drive generally has a large turning radius. Because it is pushed by the movement of its rear wheels and continues to move forward throughout the duration of the turn. The cart's turning radius is greater than the length of the cart. As a result, carts having rear wheel drive are difficult and cumbersome to operate.

Another drawback to a cart with rear wheel drive is that the front wheel(s) is subject to skipping or skidding across the floor's surface when cornering the cart. This typically occurs when making a sharp turn into the rear wheel that is powered combined with the front wheel not being aligned with the direction of the cart's movement (i.e., such as when the front wheel is turned to corner the cart). In these instances, the forward movement of the cart overcomes the turning motion of the front wheel and the front wheel is unable to rotate properly to guide the cart, resulting in the wheel skidding or skipping across the surface of the floor.

Therefore, there is a need for a lightweight, motorized cart that is easy to maneuver in small areas and that can operate on a 12-volt battery system with adequate power to transport a passenger and additional items. There is also the need for a motorized cart having front wheel drive with the motor contained within the front wheel.

II. SUMMARY

The present invention is a motorized cart having a hub gear motor system. The motorized cart includes a cart body movably mounted on a pair of rear wheels and a front wheel. The hub gear motor system includes a means for driving the cart which is substantially contained within the casing of the front wheel. The cart is powered by a 12-volt rechargeable battery.

It is an object of the present invention to provide a motorized cart with a hub gear motor system that is easily maneuverable by an operator.

It is a further object of the present invention to provide a motorized cart that corners smoothly.

It is a further object of the present invention to provide a motor arrangement on a three-wheeled motorized cart that inhibits skipping of the front wheel when turning the cart.

It is a further object of the present invention to provide a motorized cart that operates on a 12-volt battery.

III. BRIEF DESCRIPTION OF DRAWINGS

Reference is made to the accompanying drawings in which are shown illustrative embodiments of the invention and from which novel features and advantages will be apparent.

IV. DETAILED DESCRIPTION

Figure 1:
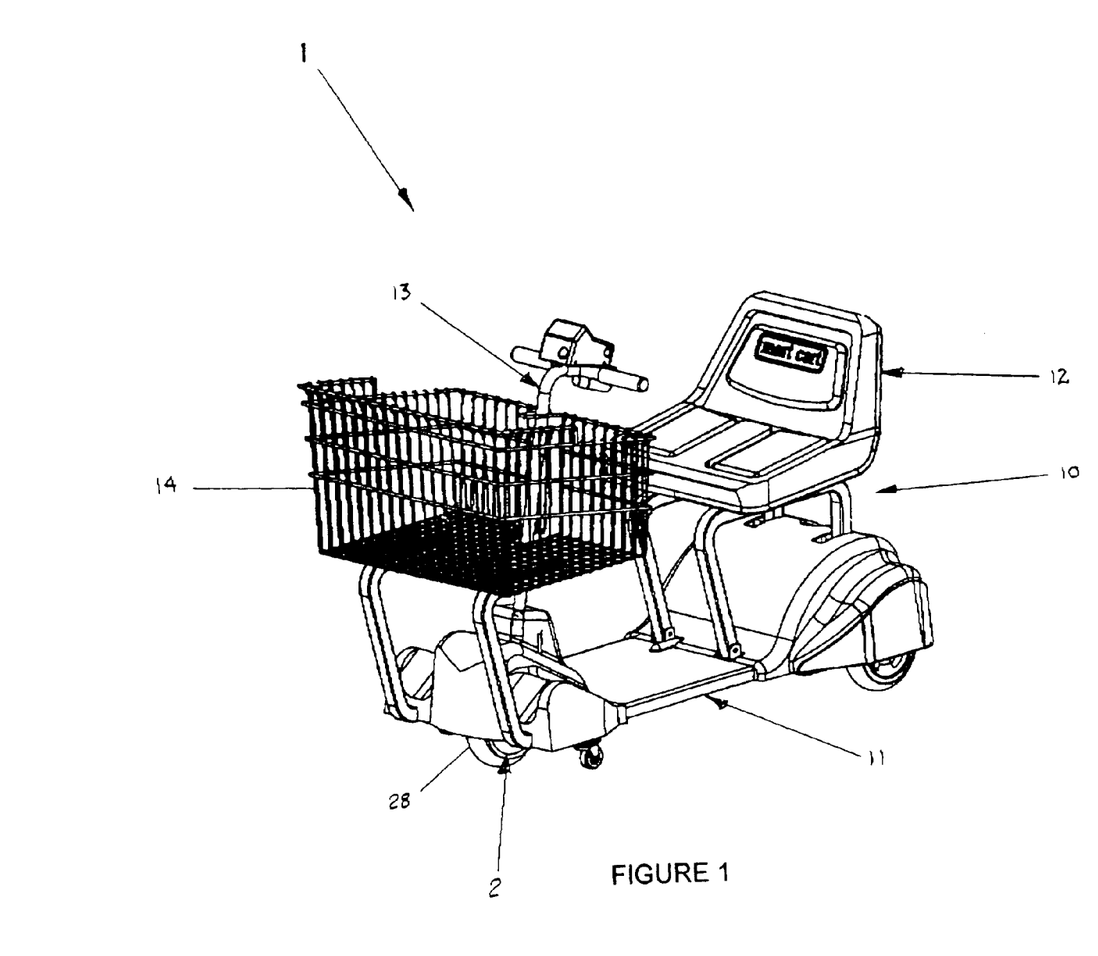
FIG. 1 is a top perspective view of a preferred embodiment of the motorized cart of the present invention.
Figure 7:
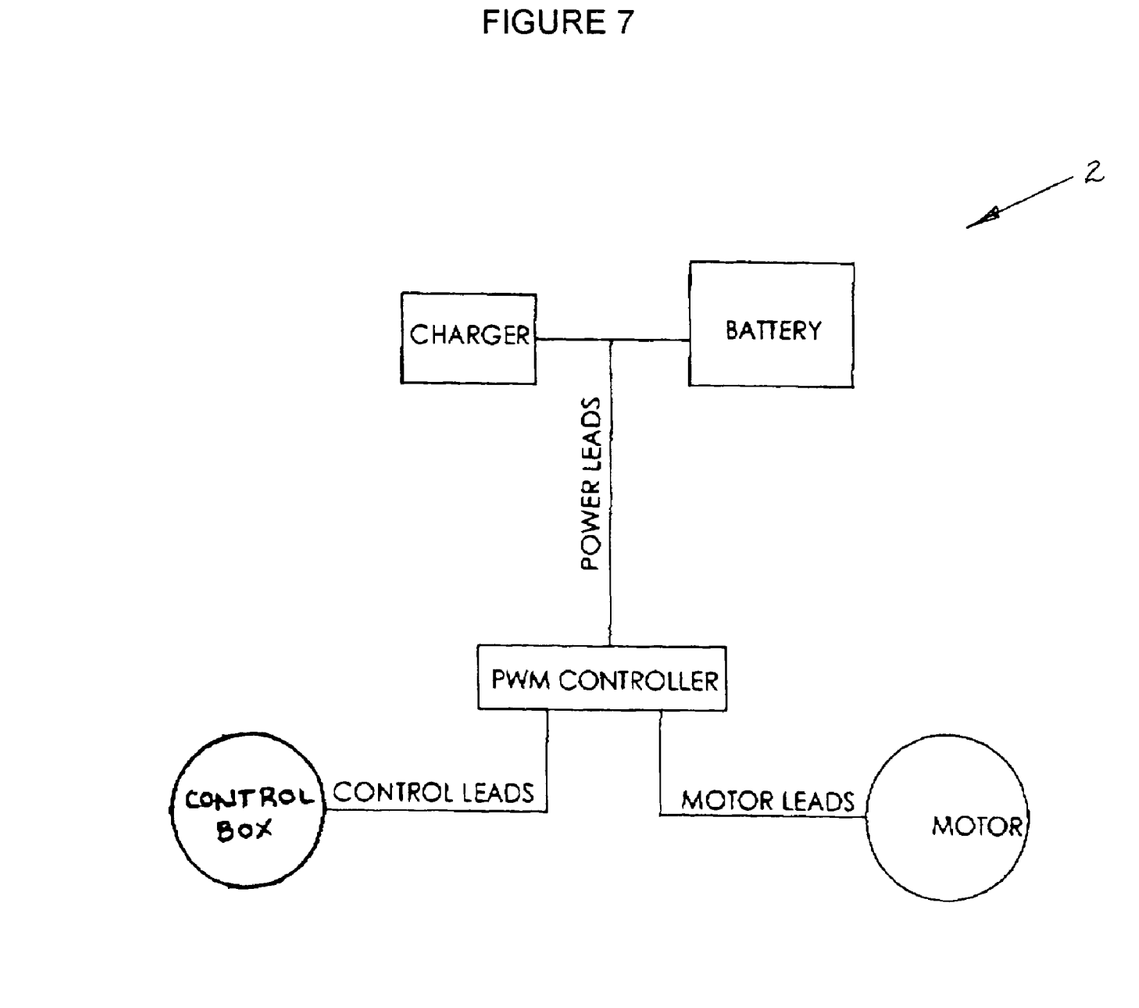
FIG. 7 is a schematic diagram of the hub gear motor system of the cart in FIG. 1.

Referring to the drawings in which like reference numerals designate like or corresponding parts throughout the several views, there is shown in FIGS. 1 and 7, a motorized cart (1) with a hub gear motor system (2). The motorized cart (1)

It is a further object of the present invention to provide a hub gear motor system that has forward and reverse movements.

It is a further object of the present invention to provide a motorized cart that has a turning radius approximately equal to the length of the cart.

It is a further object of the present invention to provide a motorized cart with an inexpensive and simplified drive means.

It is an object of the present invention to provide a hub gear motor system that can be used to drive an electric cart.

It is a further object of the present invention to provide an electric cart with a wheel that comprises a hub gear motor system to drive the wheel.

It is a further object of the present invention to provide a motorized cart that has front wheel drive.

It is a further object of the present invention to provide an electric cart with a means for driving the cart that is disposed within the front wheel of the cart.

It is a further object of the present invention to provide a motorized cart that has a reduced turning radius.

It is a further object of the present invention to provide a hub gear motor having dynamic braking capability.

It is a further object of the present invention to provide means to deter free-wheeling of a wheel with a hub gear motor system. comprises a cart body (10). The hub gear motor system (2) includes means for driving the cart body, means for powering the driving means and means for controlling the driving means.

Figure 2:
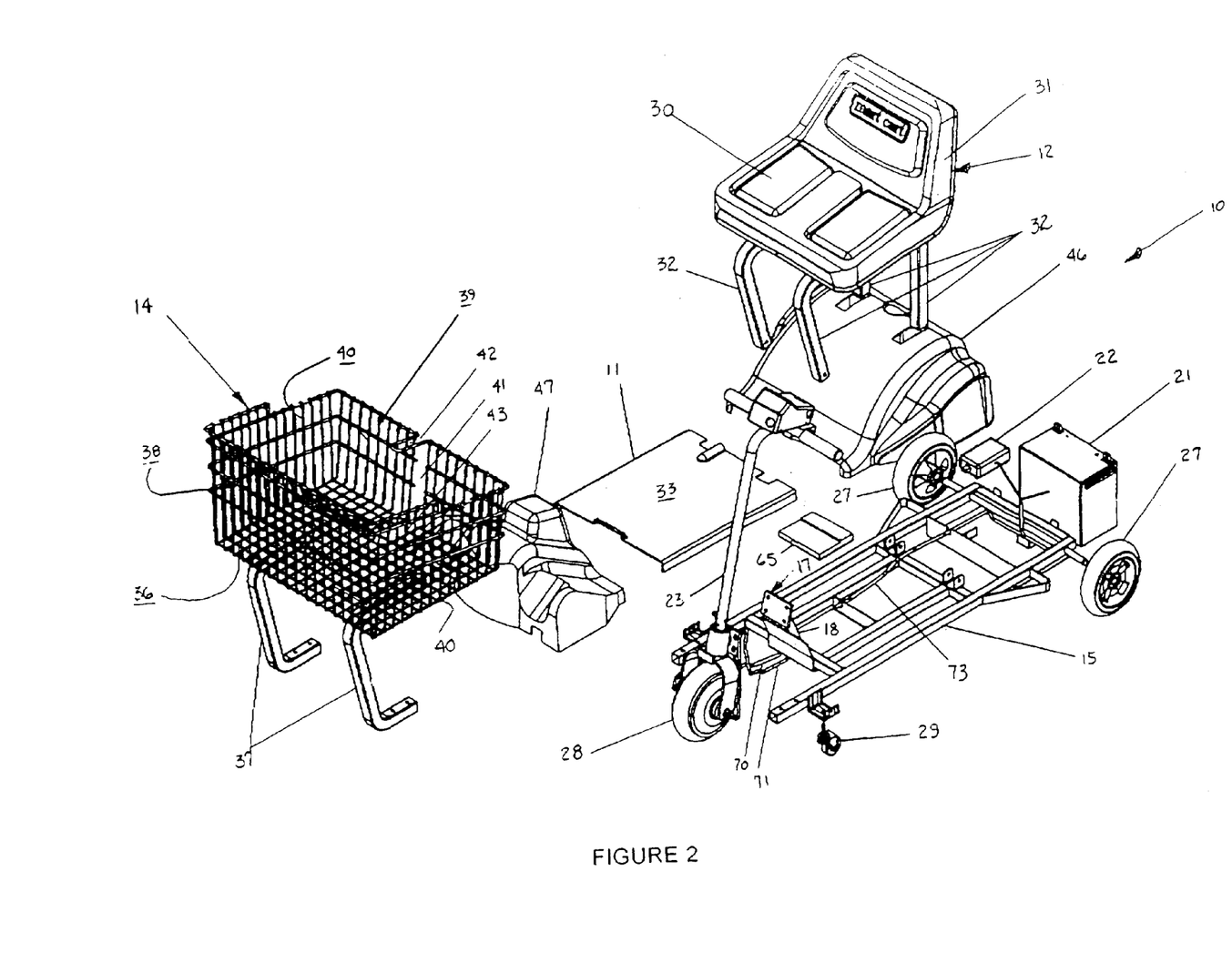
FIG. 2 is an exploded perspective of the cart shown in FIG. 1.

The cart body (10) includes a platform (11) with a seat (12), a plurality of wheels, a steering unit (13) and a storage receptacle (14). As shown in FIG. 2, the cart body (10) also has a support frame (15) that provides an infrastructure for supporting the seat (12) and the platform (11). The support frame (15) itself is comprised of a plurality of longitudinal pieces and cross pieces. The support frame (15) also includes a column support bracket (17) which has an outer support surface (18) thereon.

Figure 3:
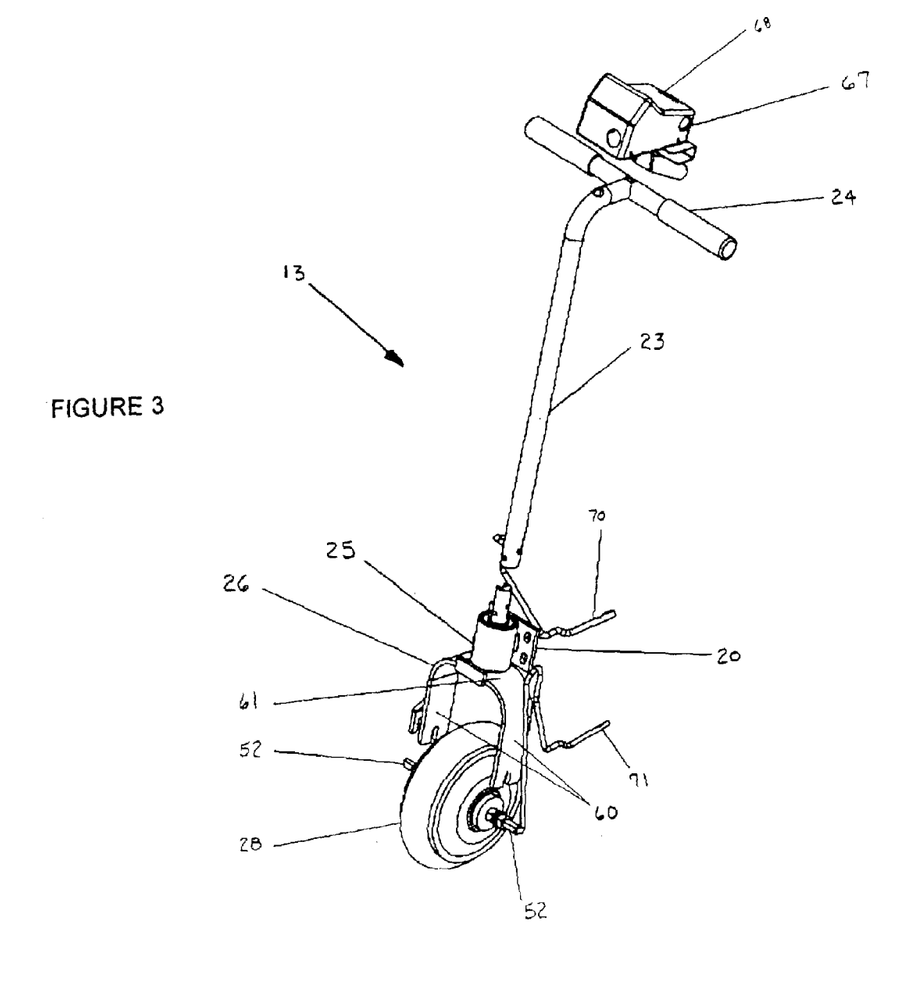
FIG. 3 is a partial view of the cart in FIG. 1 showing the steering unit.

Referring to FIGS. 2 and 3, the steering unit (13) is shown to include a steering column (23) having two ends with a handle (24) at one of the ends. Disposed on the end of the steering column (23) opposite the handle (24) are a fork assembly (26), a pivot bearing (25) and a frame attaching plate (20).

The seat (12) is characterized by a bench (30) with a back support (31) and a plurality of seat legs (32) that mount the bench (30) and back support (31) on the support frame (15) of the cart body (10).

In a preferred embodiment, the storage receptacle is a basket (14) having a plurality of walls. Basket support legs (37) mount the basket (14) above the support frame (15) of the motorized cart (1). The basket's walls include a bottom wall (36), a leading wall (38), a trailing wall (39) and a pair of side walls (40). The trailing wall (39) has an elongated opening (41) extending from its top edge to its bottom edge. An inlet (42) extends inwardly from the opening (41) at a top edge of the trailing wall (39). A slot (43) is formed at a bottom (36) of the opening in the bottom wall (36). The slot (43) is generally vertically aligned with the inlet (42).

The cart body (10) also includes a covering assembly which comprises rear (46) and front (47) shrouds. The rear shroud (46) substantially covers the battery (21) and battery charger (22). It also houses a portion of the rear wheels (27). Toward the front of the cart (1), the front shroud (47) protects upper and side portions of the front wheel (28). Although in a preferred embodiment, it extends over the battery (21) and the battery charger (22), the rear shroud (46) could be removed or modified to provide additional storage space under the seat (12) were it desired.

Figure 4:
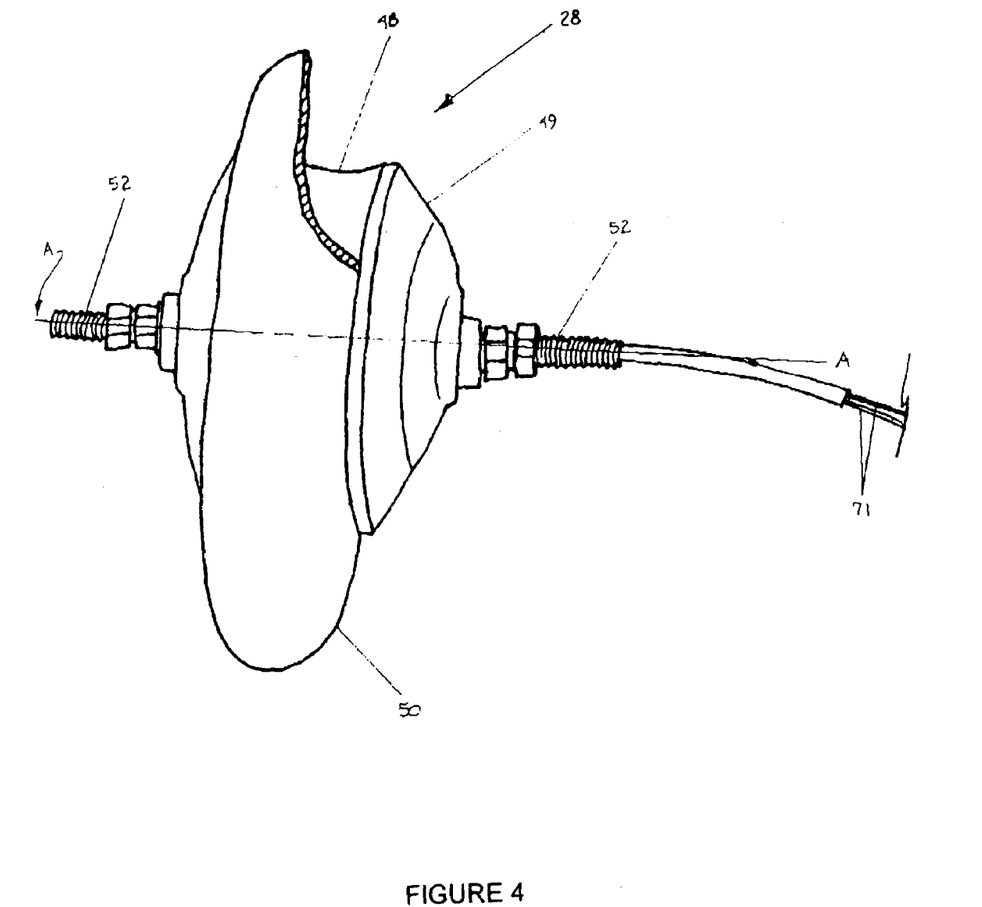
FIG. 4 is a side view of the front wheel of the motorized cart in FIG. 1 with the tire partially cutaway.

The plurality of wheels includes a pair of rear wheels (27) and a front wheel (28). Additionally, there are two anti-tip casters (29) on the cart body (10) located adjacent to the front wheel (28). The front wheel (28) as shown in FIG. 4 includes a rim (48) with a hub casing (49) and a tire (50). The tire (50) is mounted around the rim (48). Threaded rods (52) extend outwardly from the hub casing (49) on each side of the front wheel (28) defining a horizontal axis of the front wheel (28) which comprises a first rotational axis (A).

Referring to FIGS. 2 and 3, the means for powering the driving means of the motorized cart include a battery (21) accompanied by a battery charger (22). The means for controlling the driving means comprise a control box (67) a power width modulator (PWM) controller (65), and a plurality of leads. Each of said leads preferably comprises a cable.

Figure 5:
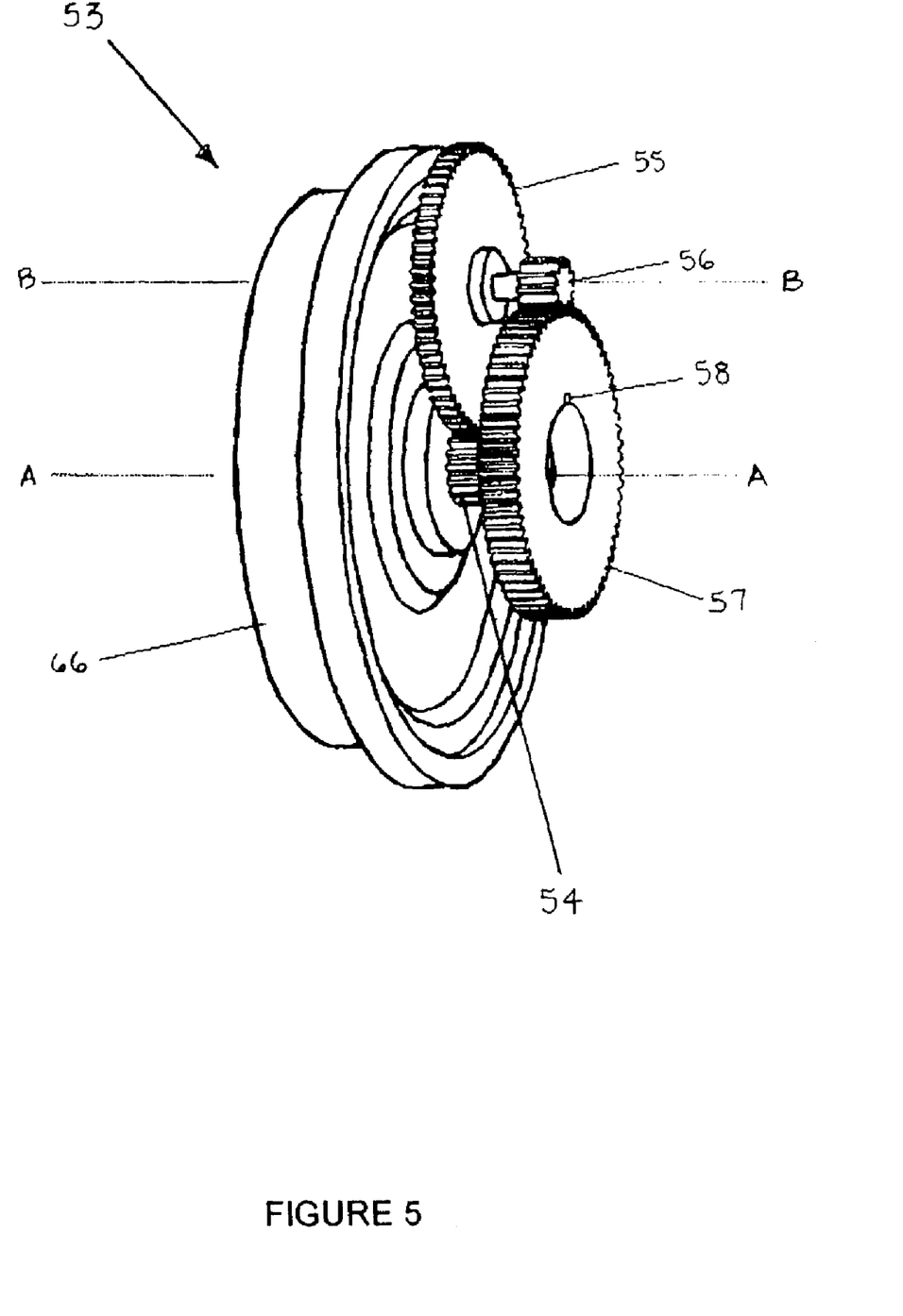
FIG. 5 is a schematic view of the hub gear motor system in the motorized cart of FIG. 1.
Figure 6A:
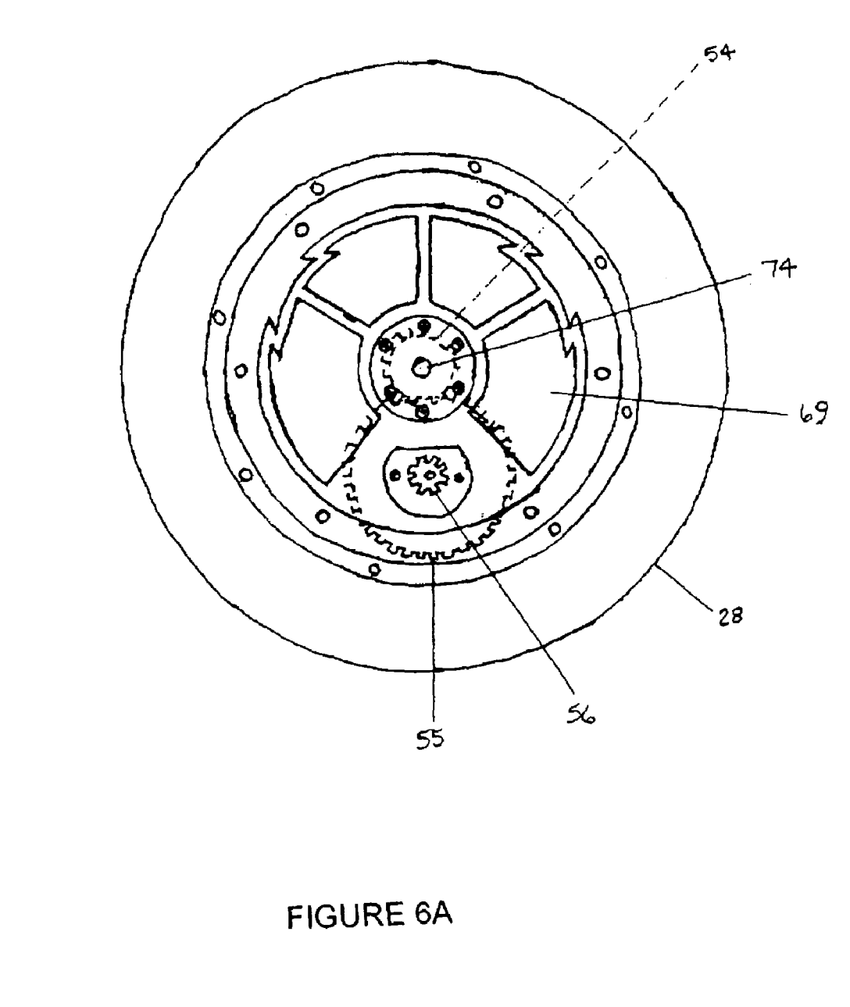
FIG. 6A is a partial inside view of the front wheel and means for driving the cart of FIG. 1 with part of the casing and fourth gear removed.
Figure 6B:
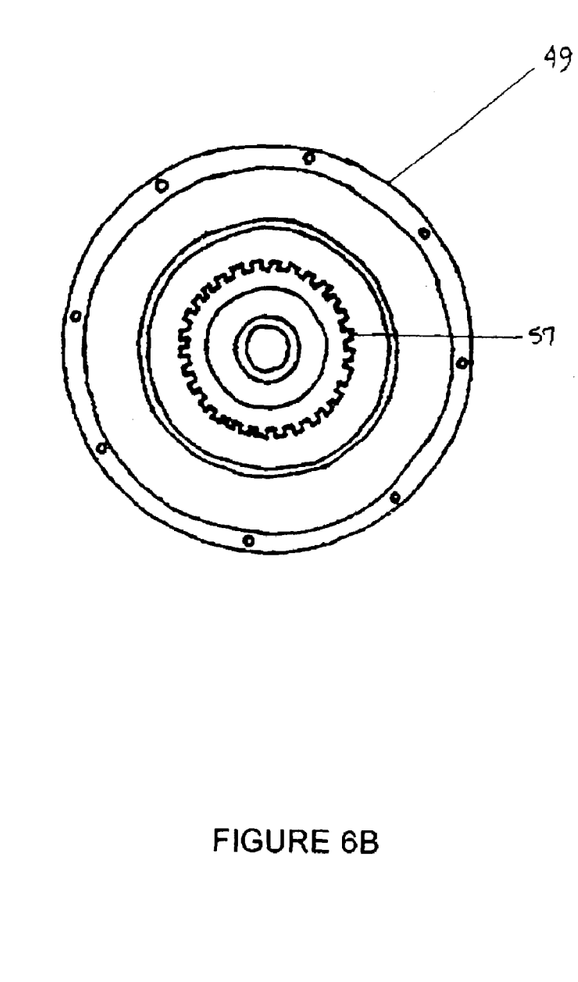
FIG. 6B is a partial inside view of the part of the casing and fourth gear removed from the front wheel of FIG. 6A.

In FIGS. 5, 6A and 6B, the means for driving the cart is shown to comprise an electric reversible motor (66), first (54), second (55), third (56) and fourth (57) gears and an intermediate plate (69). The means for driving the cart is contained within the hub casing (49) of the cart's front wheel (28). The fourth gear (57) has a keyway (58) thereon.

Referring to FIGS. 2, 3 and 7, the plurality of leads includes motor leads (71), control leads (70), and power leads (73). The PWM controller (65) is connected to the electric reversible motor (66) by the motor leads (71). It is further connected to the control box (67) by the control leads (70). Power leads (73) extend between the PWM controller (65) and the battery charger (22), the battery (21) and the PWM controller (65), and the battery charger (22) and the battery (21).

In a preferred embodiment of FIG. 2, the frame (15) has a generally rectangular shape with the platform (11) supported thereon. The platform (11) includes a generally planar surface that serves as a foot support area for passengers in the cart (1).

Regarding the steering unit (13) in FIG. 3, the steering column (23) is an elongated bar having two ends with the fork assembly (26) disposed at one of the ends and the handle (24) disposed at the opposite end of the column (23). The fork assembly (26) is U-shaped and is formed by two arms (60) and a yoke (61). The two arms (60) are disposed parallel to each other with the yoke (61) adjoining the two arms (60). Therefore, one end of each arm (60) is attached to the yoke (61), while the opposite end is attached to a respective threaded rod (52) on the front wheel (28). Each arm (60) extends to an opposite side of the front wheel (28) so that the fork assembly (26) straddles the front wheel (28). One end of the pivot bearing (25) is adjacent to the yoke (61) and the opposite end receives the steering column (23). The frame attaching plate (20) is mounted to a side of the pivot bearing (25) such that the steering unit (13) can pivot independently of the cart's frame (15).

In a preferred embodiment of FIG. 1, the basket (14) has a rectangular configuration. The basket support legs (37) are U-shaped comprising a pair of spaced-apart, generally parallel members and a connecting cross piece. The parallel members of each basket support leg (37) are respectively attached to the basket (14) and to the frame (15). The seat legs (32) support the horizontal bench (30) and back support (31) above the platform (11). The seat (12) is adapted to accommodate a passenger comfortably on the motorized cart (1). The handle (24) of the front steering unit (13) comprises a tubular member. However, the handle can be reconfigured to various other suitable shapes.

The rear shroud (46) protects the battery (21) and battery charger (22) and helps to secure them on the platform (11) of the cart (1). When covered, the battery (21) and battery charger (22) are less likely to come into direct contact with people or objects, thereby reducing the possibility of damage or injury. In addition, the rear shroud (46) deters vandalism to the battery (21) and battery charger (22).

The front shroud (47) is on a front section of the support frame (15). It extends over a lower portion of the steering unit (13) and covers part of the front wheel (28) including the PWM controller (65). The front shroud (47) acts as a protective mechanism to deter passengers and other objects from coming into contact and/or becoming entangled with the cart's front wheel (28). In addition, the rear (46) and front (47) shrouds enhance the aesthetic appeal of the cart (1). Preferably, the shrouds (46,47) are made of plastic, but fiberglass or other suitable lightweight materials could be used instead.

The support frame (15) of the cart body (10) provides a base for supporting particular elements of the cart (1), including the seat (12), the platform (11), the basket (14) and the hub gear motor system (2).

The basket (14) is a receptacle for storing items. It is especially useful for cart users when shopping. The slot (43) in the basket's bottom wall (36) in cooperation with the elongated opening (41) in the trailing wall (39) and the inlet (42) in the trailing wall (39) form a column receiver that partially encircles a portion of the steering column (23) of the steering unit (13). By manipulating the handle (24) on the steering unit (13) a passenger is able to steer the motorized cart (1) in the desired direction. As the handle (24) is moved by the user, the steering motion translates from the handle (24) through the steering column (23) to the front wheel (28) of the cart (1). The fork assembly (26) moves the front wheel (28) in direct response to the movement of the steering column (23).

The hub gear motor system (2) moves the cart by rotating the front wheel (28) of the cart in selected forward and rearward motions. Within the hub casing (49) in FIGS. 5, 6A and 6B, the gears (54–57) of the means for driving the cart body link the electric reversible motor (66) to the front wheel (28) and translate the rotational motion of the electric reversible motor (66) is driven by the front wheel (28). Rotation of the front wheel (28) provides movement to the motorized cart (1).

The means for driving the cart body is actuated by the means for powering. Specifically, the electrical reversible motor (66) is driven by the battery (21). The motor (66) is operated by the user via the control box (67). The speed and direction of the electric reversible motor (66) are modulated by the user via a throttle on the control box (67), while the voltage directed to the motor (66) is regulated by the PWM controller (65).

In a preferred embodiment, the throttle comprises a wig-wag switch (68). By manually manipulating the wig-wag switch (68), a user selects the desired speed and direction of the electric reversible motor (66). Although a wig-wag switch is preferred, other types of suitable switches could be used instead of a wig-wag switch to control the speed and direction of the cart.

The electric reversible motor (66) rotates the front wheel (28). The front wheel (28) can move in both a forward direction and a reverse direction on the cart (1) in response to the rotation of the electric reversible motor (66). The first (54), second (55), third (56) and fourth (57) gears translate the rotational motion of the electric reversible motor (66) to the front wheel (28). Disposed in the fourth gear (57) of the motor (66), the keyway (58) enables the front wheel (28) to move in both forward and reverse directions as the motor (66) moves in corresponding forward and reverse directions.

The column support bracket (17) on the front end of the frame (15) adjoins the attaching plate (20) on the pivot bearing (25) in order to mount the steering unit (13) onto the support frame (15) of the cart (1). Disposed on the column support bracket (17) is the outer support surface (18). This surface (18) is angled upwardly and supports the PWM controller (65) thereon.

The front (28) and rear (27) wheels and the anti-tip casters (29) are mounted on the support frame (15) of the motorized cart (1). Each of the anti-tip casters (29) are positioned on a respective side of the front wheel (28) at the front end of the support frame (15). Flanking the front wheel (28), the anti-tip casters (29) are generally aligned with each other and are approximately aligned with the front wheel (28).

The anti-tip casters (29) are a safety feature and function to deter sideways tipping of the motorized cart (1). If the motorized cart (1) tilts too far to one side, the anti-tip caster (29) on that side engages the floor to limit further tipping of the cart (1). As such, the casters (29) are positioned for intermittent contact with the supporting surface on which the cart (1) rests. Consequently, either one or none of the anti-tip casters (29) are contacting the floor or supporting surface at a given time.

In the front wheel's hub casing (49), the first gear (54) is rigidly attached to the rotor (74), a rotating arm of the electric reversible motor (66). The first gear (54) rotates with the rotor (74) when the electric reversible motor (66) is operating. The teeth of the second gear (55) are engaged with the teeth of the first gear (54) as shown in FIGS. 5, 6A and 6B. The third gear (56) is fixed to the second gear (55) with the axes of the second (55) and third (56) gears being coincident along a second rotational axis (B). This second rotational axis (B) is offset from the first rotational axis (A). The teeth of the third gear (56) are in engagement with the fourth gear (57). The fourth gear (57) is rigidly attached to the hub casing (49) which is mounted to the front wheel (28) by screws or other suitable means. The second (55) and third (56) gears are rotatably mounted on opposite sides of the intermediate plate (69) which is rigidly attached at its perimeter to the motor. While the second (55) and third (56) gears rotate together about the second rotational axis (B), the intermediate plate (69) can rotate with the motor about the first rotational axis (A).

In a preferred embodiment, the motorized cart (1) has a top speed of approximately two miles per hour. The first gear (54) has 19 teeth and the second gear (55) includes 62 teeth. The third gear (56) is the smallest comprising 11 teeth, while the fourth gear (57) has 70 teeth. In this preferred embodiment, the gear ratio for the hub gear motor system (2) is about 21 to 1 with the diameter of the front wheel (28) being approximately 8 inches. The battery (21) is a 12-volt battery. This combination results in the preferred top speed of the cart (1) of two miles per hour.

Particular motion components of the cart (1) can be varied to obtain different resultant top speeds, if desired. The motion components of the motorized cart (1) include the diameter of the front wheel, the voltage capacity of the battery power source, and the gear ratios between the cooperating gears. As for example, by increasing the diameter of the front wheel, the maximum speed of the motor can be increased. The top speed of the cart can also be increased by increasing the voltage of the battery. As is conventionally recognized, by decreasing the overall gear ratio of the hub gear motor system, the resultant top speed of the cart can be increased. Conversely, by increasing the overall gear ratio, the maximum speed of the cart can be decreased.

To use the motorized cart, a passenger sits in the seat placing his/her feet on the foot support area of the platform (11). The passenger selects either the forward or the reverse direction from the control box (67) and activates the cart to move at a selected speed. As the cart moves, the user steers the front wheel (28) in the desired direction. To stop the cart (1) the switch (68) is released and the cart comes to a stop.

During use, the electric reversible motor (66) directly rotates the first gear (54) in the direction selected on the control box (67). The rotation of the first gear (54) drives the second gear (55). As the second gear (55) rotates, the third gear (56) turns at the same rotational speed and imparts movement to the fourth gear (57). With the fourth gear (57) affixed to the front wheel's casing (49), the movement of the fourth gear (57) directly effects movement of the front wheel (28) and therefore movement of the cart (1).

Once the cart (1) is in motion, the passenger can maneuver the cart (1) by turning the front wheel (28) via the steering unit (13) in the direction he or she desires to travel. The cart (1) can be activated to move in either the forward or reverse direction by selecting the rotational direction of the electric motor (66). The rotational direction of the electric reversible motor (66) is selected using the switch (68) on the control box (67).

In one preferred embodiment a dynamic braking action which is effected by the PWM controller (65) stops the motorized cart (1). To stop the cart (1), the user releases the switch (68) which signals the PWM controller (65) via the control leads (70). Signaling through the power (73) and motor (71) leads, the PWM controller (65) drops the amount of voltage to the electric motor (66) and the cart (1) comes to a stop. Although the dynamic braking action implemented by the PWM controller (65) is disclosed herein, other suitable types of braking systems could be used to slow and/or stop the cart during use.

The cart moves as the front wheel is activated by the electric motor (66). With front wheel drive, the rear wheels of the cart track with the movement of the-front wheel and the motorized cart can be turned in an amount of space equal in length to the length of the cart. With a smaller turning radius, the motorized cart of the present invention can be easily maneuvered about in small areas.

With the hub gear motor system of the motorized cart, the cart is pulled in a forward direction by the movement of the front wheel. Since the motorized cart has front wheel drive, skidding of the front wheel is minimized when cornering the cart.

The storage receptacle is preferably, though not necessarily, supported directly on the frame of the cart rather than the steering column. Being attached to the frame, the weight of the basket and its contents do not interfere with steering the cart.

The cart can be moved in both forward and reverse directions via the gears by changing the motion of the electric reversible motor which engages and rotates the front wheel. By reversing the direction of the motor, the front wheel can be rotated in an opposite direction. Furthermore, the hub gear motor system enables the motorized cart to operate effectively using a 12-volt battery.

Although the present invention has been described in considerable detail with reference to certain preferred versions thereof, other versions are possible.

Therefore, the spirit and scope of the appended claims should not be limited to the description of the preferred versions contained herein.

The invention claimed is:

1. A motorized cart comprises:
a cart body; and
a hub gear motor system;
said cart body includes a support frame, a steering unit, a plurality of wheels, a seat and a platform;
said plurality of wheels is attached to said support frame and includes at least one rear wheel and at least one front wheel;
a plurality of antitip casters generally aligned with said front wheel, wherein one of said antitip casters is positioned on one side of said front wheel and another of said anti-tip casters is positioned on another side of said front wheel;
said front wheel comprises a rim, a tire, a hub casing and two threaded rods, said hub casing is mounted to opposite sides of the rim and said threaded rods define a horizontal rotational axis of the front wheel comprising a first rotational axis;
said steering unit comprises a steering column;
said hub gear motor system drives the front wheel in forward and rearward directions and includes an electric reversible motor with a rotor and an intermediate plate; said electric reversible motor of the hub gear motor system further comprises first, second, third and fourth gears, wherein said electric reversible motor of the hub gear motor system is contained within said hub casing of the front wheel; the first gear is engaged with the rotor of the electric reversible motor; the first gear further is engaged with the second gear; the second gear is fixedly attached to the third gear; the second and third gears are disposed on opposite sides of the intermediate plate; the intermediate plate is attached to the motor; the second and third gears rotate about a second rotational axis which is offset from the first rotational axis; the fourth gear is fixed to the hub casing and rotates about the first rotational axis; and the hub casing is nonrotatably attached to the rim;
wherein said gears translate rotational motion of the electric reversible motor to the at least one front wheel, said first gear is driven by the electric reversible motor, the second gear is driven by said first gear, the third gear rotates with said second gear, said fourth gear is driven by said third gear, said hub casing is rotated by said fourth gear;
a 12-volt battery and a battery charger, wherein said battery provides power to the electric reversible motor;
a control box, a power width modulator controller and a plurality of leads; wherein said control box is mounted on the steering unit and controls the speed and direction of the electric reversible motor;
said power width modulator controller regulates voltage directed to the motor via the throttle;
said plurality of leads comprises power leads, control leads and motor leads, wherein said power leads extend between the battery, the battery charger and the power width modulator controller; said control leads extend between said control box and said power width modulator controller; and said motor leads extend between said electric reversible motor and said power width modulator controller.

2. A motorized cart comprises:
a cart body; and
a hub gear motor system;
said cart body includes a support frame, a steering unit, and a plurality of wheels;
said plurality of wheels is attached to said support frame and includes at least one rear wheel and at least one front wheel;

said front wheel comprises a rim, a tire and a hub casing, wherein said hub casing is mounted to opposite sides of the rim and said front wheel rotates about a first rotational axis;

said hub gear motor system drives the front wheel in forward and rearward directions and includes an electric reversible motor with a rotor, an intermediate plate, and first, second, third and fourth gears;

wherein said electric reversible motor is contained within said hub casing of the front wheel and the first gear is mounted on the rotor of the electric reversible motor;

wherein the first gear is engaged with the second gear and rotates about the first rotational axis, the second gear is fixedly attached to the third gear, the second and third gears are disposed on opposite sides of the intermediate plate, the intermediate plate is attached to the motor, the second and third gears rotate about a second rotational axis which is offset from the first rotational axis, the fourth gear is fixed to the hub casing and rotates about the first rotational axis, and the hub casing is nonrotatably attached to the rim;

said hub gear motor system further comprises:
a battery;
a control box;
a power width modulator controller; and
a plurality of leads;

wherein said battery provides power to the electric reversible motor; said control box controls the speed and direction of the electric reversible motor; and said power width modulator controller regulates voltage directed to the motor;

said plurality of leads comprises power leads, control leads and motor leads;

wherein said power leads extend between the battery and the power width modulator controller; said control leads extend between said control box and said power width modulator controller; and said motor leads extend between said electric reversible motor and said power width modulator controller;

wherein said first, second, third and fourth gears translate rotational motion of the electric reversible motor to the at least one front wheel to move the cart body, said first gear is driven by the electric reversible motor, the second gear is driven by said first gear, the third gear rotates with said second gear, said fourth gear is driven by said third gear, said hub casing is rotated by said fourth gear.

3. The motorized cart of claim 2, wherein said front wheel further includes a pair of threaded rods which are coaxial with the first rotational axis.

4. The motorized cart of claim 2, wherein said hub gear motor system further comprises a battery charger and said power leads extend between the battery, the battery charger and the power width modulator controller.

5. The motorized cart of claim 2, wherein the gear ratio of the means for driving the cart is approximately 21 to 1.

6. The motorized cart of claim 2, wherein the first gear comprises 19 teeth, the second gear comprises 62 teeth, the third gear comprises 11 teeth and the fourth gear comprises 70 teeth.

7. The hub gear motor system of claim 2, wherein said control box includes a throttle for controlling the speed and direction of the electric reversible motor; and said power width modulator controller regulates the voltage applied to the motor in response to the throttle.

8. The motorized cart of claim 3, further comprising at least one antitip caster generally aligned with said front wheel.

9. The motorized cart of claim 4, wherein said battery comprises a 12-volt battery.

10. The motorized cart of claim 5, wherein a diameter of the front wheel is about 8 inches.

11. A hub gear motor system for use on a vehicle wheel having a rim with a hub casing, said hub gear motor system comprises:

an electric reversible motor comprising first, second, third, and fourth gears, a rotor and an intermediate plate; wherein said electric reversible motor drives the wheel in forward and rearward directions and is contained within said hub casing of the vehicle wheel;

a battery which provides power to the electric reversible motor;

a control box which controls the speed and direction of the electric reversible motor;

a power width modulator controller which regulates voltage directed to the motor; and a plurality of leads comprising power leads, control leads and motor leads;

wherein said power leads extend between the battery and the power width modulator controller; said control leads extend between said control box and said power width modulator controller; and said motor leads extend between said electric reversible motor and said power width modulator controller;

said first gear is mounted on the rotor of the electric reversible motor to rotate about a first rotational axis and is engaged with the second gear;

said second gear is fixedly attached to the third gear;

said second and third gears are disposed on opposite sides of the intermediate plate;

said second and third gears rotate about a second rotational axis;

said first rotational axis is offset from said second rotational axis;

said fourth gear is fixed to the hub casing and rotates about the first rotational axis; and wherein said gears translate rotational motion of the electric reversible motor to the wheel, said first gear is driven by the electric reversible motor, the second gear is driven by said first gear, the third gear rotates with the second gear, said fourth gear is driven by said third gear, and said hub casing rotates with said fourth gear.

12. The hub gear motor system of claim 11, further comprising a battery charger, wherein said power leads extend between the battery, the battery charger and the power width modulator controller.

13. The hub gear motor system of claim 12, wherein said battery comprises a 12-volt battery.

* * * * *

UNITED STATES PATENT AND TRADEMARK OFFICE
CERTIFICATE OF CORRECTION

PATENT NO. : 7,108,090 B2
APPLICATION NO. : 10/288805
DATED : September 19, 2006
INVENTOR(S) : Patrick E. Turner It is certified that error appears in the above-identified patent and that said Letters Patent is hereby corrected as shown below:

Column 2, line 29, insert the following paragraphs.

--It is a further object of the present invention to provide a hub gear motor system that has forward and reverse movements.
It is a further object of the present invention to provide a motorized cart that has a turning radius approximately equal to the length of the cart.
It is a further object of the present invention to provide a motorized cart with an inexpensive and simplified drive means.
It is an object of the present invention to provide a hub gear motor system that can be used to drive an electric cart.
It is a further object of the present invention to provide an electric cart with a wheel that comprises a hub gear motor system to drive the wheel.
It is a further object of the present invention to provide a motorized cart that has front wheel drive.
It is a further object of the present invention to provide an electric cart with a means for driving the cart that is disposed within the front wheel of the cart.
It is a further object of the present invention to provide a motorized cart that has a reduced turning radius.
It is a further object of the present invention to provide a hub gear motor having dynamic braking capability.
It is a further object of the present invention to provide means to deter free-wheeling of a wheel with a hub gear motor system.-- column 2, line 61 of the Patent, insert --comprises a cart body (10). The hub gear motor system (2) includes means for driving the cart body, means for powering the driving means and means for controlling the driving means.-- following the number "(1)".

Column 3, lines 1-23 should be deleted.

Column 7, line 35 change the word "the-front" to -- the front --.

In Claim 1, column 8, line 6, change "antitip" to -- anti-tip --.

In Claim 1, column 8, line 7, change "antitip" to -- anti-tip --.

UNITED STATES PATENT AND TRADEMARK OFFICE
CERTIFICATE OF CORRECTION

PATENT NO. : 7,108,090 B2
APPLICATION NO. : 10/288805
DATED : September 19, 2006
INVENTOR(S) : Patrick E. Turner It is certified that error appears in the above-identified patent and that said Letters Patent is hereby corrected as shown below:

In Claim 8, column 10, line 7, change "antitip" to -- anti-tip --.

Signed and Sealed this

Sixth Day of March, 2007

JON W. DUDAS
*Director of the United States Patent and Trademark Office*